United States Patent [19]

Achard et al.

[11] Patent Number: 5,409,516
[45] Date of Patent: Apr. 25, 1995

[54] PROCESS FOR THE PRODUCTION OF PHOSPHO-NITROGENOUS PRODUCTS AND PRODUCTS THUS OBTAINED

[75] Inventors: Patrick Achard, Le Plan-de-Grasse; Pierre Ilbizian, Mouans-Sartoux; Laurent Limousin, Bois-Guillaume; Bernard Neveu, Puteaux; Jean-Bernard Peudpiece, Mont St-Aignan; Yvan A. Schwob, Cannes, all of France

[73] Assignees: Transvalor, Alpes Maritimes; Grande Paroisse S.A., Puteaux, both of France

[21] Appl. No.: 70,383
[22] PCT Filed: Dec. 4, 1991
[86] PCT No.: PCT/FR91/00965
 § 371 Date: Sep. 15, 1993
 § 102(e) Date: Sep. 15, 1993
[87] PCT Pub. No.: WO92/10443
 PCT Pub. Date: Jun. 25, 1992

[30] Foreign Application Priority Data

Dec. 5, 1990 [FR] France ................... 90 15522

[51] Int. Cl.$^6$ ............... C05C 9/00; C05B 3/00
[52] U.S. Cl. ................... 71/29; 71/30; 426/807; 564/32
[58] Field of Search .............. 71/63, 28–30; 564/32; 426/807

[56] References Cited

U.S. PATENT DOCUMENTS 2,074,880  3/1937  Whittaker et al. ............ 564/32

FOREIGN PATENT DOCUMENTS 523121  8/1921  France .
807107  1/1959  United Kingdom .

Primary Examiner—Ferris Lander
Attorney, Agent, or Firm—Young & Thompson

[57] ABSTRACT

The method relates to the production of phospho-nitrogenous products soluble in neutral ammonium citrate and wherein free urea does not remain in significant amount in such products. Most of the free urea is involved in a ureic combination of calcium sulphate. Tricalcic phosphate is reacted with a reactant obtained by mixing sulfuric acid and urea. The process is particularly useful for the manufacture of fertilizers.

9 Claims, 1 Drawing Sheet

PROCESS FOR THE PRODUCTION OF PHOSPHO-NITROGENOUS PRODUCTS AND PRODUCTS THUS OBTAINED

FIELD OF THE INVENTION

The present invention relates to a process for the production of phospho-nitrogenous products whose $P_2O_5$ is soluble in neutral ammonium citrate.

The invention also relates to the products obtained according to the process which can be used as fertilizers or to comprise products suitable for animal feed.

BACKGROUND OF THE INVENTION

The attack of tricalcium phosphate by acids, particularly nitric, sulfuric and phosphoric, adapted to product phosphate salts soluble in neutral ammonium citrate and if desired in water, have been for a long time used industrially in the production of fertilizers and phosphate products for animal feed.

Urea is also employed, on a large scale, as nitrogenous fertilizer. Because of the major position it occupies in most of the developing countries, it constitutes even today the world's principal source of nitrogen used for fertilization of soil. Urea also has uses in animal feed.

It has on the other hand been known for a long time (the first published papers on the subject dating from 1935) that sulfuric acid combines with urea and that the mono- and bi-urea sulfates obtained have the property of forming eutectics. Processes using compositions of this type, adapted to produce liquid nitrogenous fertilizers (U.S. Pat. No. 4,116,664 of Sep. 26, 1978 and U.S. Pat. No. 4,310,343 of Jan. 12, 1982) or to treat cellulosic materials (U.S. Pat. No. 4,818,269 of Apr. 4, 1989) have been recently described.

Compositions based on phosphate salts and urea are also known and used in the production of complex granulated fertilizers. They are generally obtained by mixture of urea and phosphated compounds of the superphosphate type, produced by the attack of natural phosphate with sulfuric and/or phosphoric acid. But the industrial production and use of these products is attended by numerous difficulties which have until now greatly limited their development.

These difficulties arise from the fact that urea, which is always found in these compositions essentially in the free state, has a strong tendency to decompose above 60° C. (that is below the temperatures which are usually used to dry the fertilizers) liberating ammonia which causes the reversion of monocalcium phosphate to bicalcium phosphate. It has, on the other hand, the property of substituting itself for water in the hydrates of calcium sulfate and/or mono- and bicalcium phosphates present in superphosphates, liberating free water which promotes the deliquescence of the granules of fertilizer and their hardening into a mass.

Also the products produced by these processes are extremely difficult to dry. Their shelf lives are on the other hand very mediocre, which practically excludes the possibility of distributing them in bulk.

The document PI 7908335 describes a process for the production of phospho-nitrogenous products whose $P_2O_5$ is substantially entirely soluble in neutral ammonium citrate and in which there remains no significant quantity of free urea, this latter being, for the most part, combined in a urea compound of calcium sulfate, in which tricalcium phosphate is reacted with a reagent obtained by mixing sulfuric acid and urea containing a quantity of water less than 10% by weight and preferably of the order of 5%.

There is thus produced a double decomposition reaction, in the course of which:

the tricalcium phosphate is substantially transformed (to the extent of 80 to 90%) into monocalcium and urea phosphates, soluble in water and neutral ammonium citrate, and as to a substantially smaller portion (of the order of 5 to 15%) into bicalcium phosphate, perhaps combined with molecules of water and urea, soluble in neutral ammonium citrate;

the sulfate ions combine with a portion of the calcium ions and the urea to form tetra-urea calcium sulfate of the formula: $CaSO_4.4CO(NH_2)_2$.

Substantially all the $P_2O_5$ contained in the final product is soluble in neutral ammonium citrate and a large proportion of this $P_2O_5$, generally greater than 80%, is soluble in water.

In the presence of water, the ureates hydrolyze freeing the urea they contain. Also, when there are applied to the products according to the invention the analytical methods normally used to control fertilizers (these latter always being subjected first to solution of the product in water), it is seen that substantially all of the nitrogen that they contain is urea nitrogen.

But the combination of the urea in the form of ureates confers on the products obtained physico-chemical characteristics very different from those of compounds produced by known methods, in which the major portion of the urea is present in the free state. Thus, they possess, without the need to dry them, excellent properties for storage in bulk. They are thus less hygroscopic and they have no tendency to deliquesce.

The document PI 7908335 also proposes to react calcium phosphate with a preferably liquid mixture comprising at least one mole of urea per mole of sulfuric acid.

However, the urea salts described in this document and in particular the sulfates, are salts crystallized at ambient temperature whose use requires working at higher temperatures and the introduction of relatively great quantities of water.

Moreover, the products obtained according to document PI 7908335 must be dried by treatments which are not without effect on the quality of the final product.

SUMMARY OF THE INVENTION

Still further, during preparation of the sulfo-urea reagent, the dissolution of the urea in the sulfuric acid is very exothermic and requires certain precautions.

To overcome these drawbacks, the present invention therefore proposes a process for the production of phospho-nitrogenous products whose $P_2O_5$ is substantially entirely soluble in neutral ammonium citrate and in which there remains no free urea in a substantial quantity, this latter being, for the most part, combined in a urea compound of calcium sulfate.

According to the invention, this process is characterized in that calcium phosphate is caused to react with a preferably liquid mixture comprising between 3 and 4 moles of urea per mole of sulfuric acid.

Thus, there is produced a eutectic mixture which is liquid at ambient temperature and the attack can be conducted with reduced quantities of water.

Furthermore, more nitrogen is included in the final product and it is obtained directly dry and is not hygroscopic.

Finally, during preparation of the sulfo-ureic reagent, the dissolution of urea is endothermic. Thus, the preparation of the eutectic reagent according to the invention is athermal, which leads to numerous industrial advantages.

According to a preferred embodiment of the process, there is added to the reaction product obtained by mixing sulfuric acid and urea, phosphoric acid in a molar proportion such that the composition obtained contains between 0.1 and 2 moles of $P_2O_5$ per mole of sulfuric acid.

Preferably, the temperature of the reaction mass is maintained below 90° C. and preferably between 40° and 70° C.

The product obtained may be granulated, the granulation phase taking place several minutes after the mixture of the phosphate and the reaction product or at the end of a more or less long storage time of the product obtained.

DETAILED DESCRIPTION OF THE INVENTION

Other characteristics and advantages of the invention will become apparent from the following description.

There will now be described the essential phases for the production of the products, which are the object of the invention, starting with the method of preparing the sulfo-urea reagents.

Preparation of the Sulfo-Urea Reagents

Urea forms with sulfuric acid mono- and bi-urea compounds, well defined, containing respectively 1 and 2 moles of urea per mole of sulfuric acid. The crystallization points of these two compounds are about 70° C. These latter have the property of forming with each other a eutectic mixture $E_1$ and the bi-urea compound has on the other hand the property of forming with urea a eutectic $E_2$. These eutectics correspond approximately to the following compositions:

$E_1$: 1.3 mole of urea per mole of sulfuric acid;

$E_3$: 3.6 moles of urea per mole of sulfuric acid.

These two eutectics remain liquid above 35° C. and the addition of small quantities of water permits lowering their crystallization temperatures substantially below the usual ambient temperatures. Thus, the applicants have demonstrated that the addition of 10% of water, by weight, to the mixtures adjacent the eutectics $E_1$ and $E_2$ prevents crystallization above $-10°$ C.

The chemical stability of the mono- and bi-uric sulfates in pure form is complete to 90° C. Above this temperature, they begin to decompose, liberating gaseous $CO_2$ and ammonia which combine with the sulfate ions to form ammonium sulfate.

Taking all of this into account, the applicants have demonstrated that the best reaction compositions correspond to mixtures containing 1 mole of sulfuric acid per 1 to 4 moles of urea, and preferably 1 mole of sulfuric acid per 2 to 4 moles of urea, and containing also between 5 and 10% of water, by weight.

The only difficulty which has been encountered in the preparation of these mixtures arises from the thermal effects associated with the various phases of operation.

In liquid phase, the combination of 1 mole of urea per mole of sulfuric acid, giving mono-ureic sulfate, gives off a large quantity of heat, while the combination of a second mole of urea with the obtained compound, giving bi-ureic sulfate, is only slightly exothermic. The overall exothermic effect is considerably reduced by the endothermic effect of the passage of urea into solution. Also the dissolution of 2 to 4 moles of urea in 1 mole of sulfuric acid leads to a thermal effect easy to control.

Precautions are however to be taken as to the order in which the various constituents are brought into contact. The following mode of operation, devised by the applicant, permits controlling very easily these thermal effects. It consists in progressively adding, to a quantity of the reagent prepared in the course of a preceding operation and maintained in circulation in an agitated reactor, concentrated sulfuric acid, solid urea and if desired water, in the desired proportions. However, the precaution should be taken of awaiting, before each new addition, the substantially complete dissolution of the previously-introduced solid urea. Operating under these conditions, the temperature rise of an adiabatic reactor does not exceed several tens of degrees.

Advantageously, in large continuously operating reactors, it is possible to install double jackets or cooling coils, so as to prevent the temperature from exceeding 90° C., the threshold above which the urea in the mixture has a tendency to decompose with liberation of ammonia and carbon dioxide.

It is also in accordance with the invention to replace all or part of the sulfuric acid by oleum. All or part of the solid urea could also be replaced by an aqueous solution of urea.

It is also in accordance with the invention to add to the sulfo-ureic reagent, containing between 2 to 4 moles of urea per mole of sulfuric acid, phosphoric acid, in a molar proportion such that the final reagent contains between 0.1 and 2 moles of $P_2O_5$ per mole of sulfuric acid. This reagent remains substantially stable under the same conditions as those previously set forth for sulfo-ureic reagents.

It is best however, in these two latter cases, to take account of the quantity of water supplied by the materials first used and of the consequences, as to the heat balance, of their physico-chemical state.

Solubilization of Calcium Phosphate by the Sulfo-Ureic Reagent

There will now be described the second phase of the process, namely the solubilization reaction of the calcium phosphate by the sulfo-ureic reagent.

When such a reagent is brought into contact with particulate calcium phosphate, an exothermic reaction results. It corresponds schematically to the transformation of tricalcium phosphate to mono- and/or bicalcium phosphates and/or ureates, while the sulfate ions are fixed to the liberated calcium ions, forming a ureic complex of calcium sulfate that the applicants have identified as being the tetra-ureate of calcium sulfate. A portion of the urea can also attach to the mono- and/or bicalcium phosphates, in the form of ureates.

The characterization of calcium phosphate tetra-ureate can be carried out by a non-destructive analytical method such as for example x-ray diffraction spectrography, because, as was indicated above, the conventional chemical analysis methods in aqueous solution cause the hydrolysis of this latter and its conversion to gypsum and urea.

To obtain in the final product the optimum soluble $P_2O_5$ content and to block in the form of tetra-ureate calcium sulfate most of the urea used, the quantities of sulfuric acid and of urea making up the composition of the sulfo-ureic reagent used to treat 1 kg of natural phosphate, can be calculated in the following way:

- from the calcium content of the natural phosphate can be evaluated the number $M_1$ of moles of $Ca^{2+}$ contained in 1 kg of phosphate;
- from the $P_2O_5$ content of the same phosphate, can be evaluated the number $M_2$ of moles of $P_2O_5$ contained in 1 kg of the phosphate;
- the number $M_3$ of moles of $Ca^{2+}$ available for combination with the $SO_4^{2-}$ ions is equal to $M_1-M_2$ (assuming the simplified hypothesis that all the $P_2O_5$ in the final product is combined with calcium ions in the form of monocalcium phosphate);
- the number of moles of $SO_4^{2-}$ applied by the sulfo-ureic reagent must therefore be equal at least to $M_3$.

The reaction between the granulated calcium phosphate (80% passing an 80 micron screen) and the sulfo-ureic reagent takes place in two easily identifiable steps:

In a first relatively short step, of a duration generally less than 10 minutes when the initial temperature of the reaction medium is comprised between 50° and 70° C., an exothermic process brings progressively the reaction mass from the liquid condition to pulp. At this stage, most of the chemical reactions leading to the formation of soluble phosphates and tetra-urea calcium sulfate are already very advanced.

Following this first step, during which the temperature of the reaction medium increases by about 20° C., there is a second phase, of slower progress, in the course of which the solubilization reaction of the phosphate takes place and the compounds formed crystalize. The crystallization of the ureates gives rise to a phenomenon very analogous to the process of setting of hydraulic cements.

When the sulfo-phospho-ureic reagent is used, the course of the combination of the reaction phases is analogous. The same is true when certain secondary constituents (particularly potassium sulfate, potassium chlorate, kieserite) are added in the course of the reaction process.

Identification of Certain of the Compounds Formed

The product resulting from the reaction of tricalcium phosphate with the sulfo-(phospho)-ureic reagent is reduced to a powder of the necessary fineness and analyzed by x-ray diffraction according to the DEBYE-SCHERRER method. There is thus obtained a diagram comprising the characteristic lines of the crystalline species present.

BRIEF DESCRIPTION OF THE FIGURES

In the drawings there is shown by way of reference the comparative diagrams for urea, gypsum and the tetra-ureate of calcium sulfate. More particularly.

Figure 1:
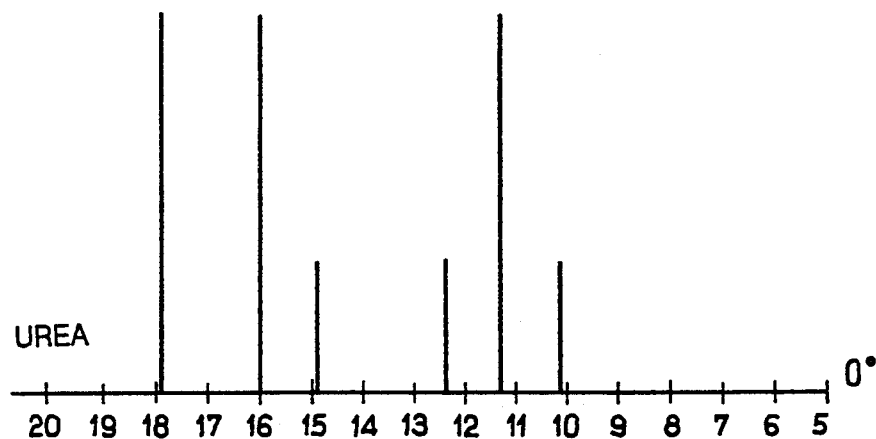
FIG. 1 is an X-ray diffraction diagram depicting the characteristic lines of urea.
Figure 2:
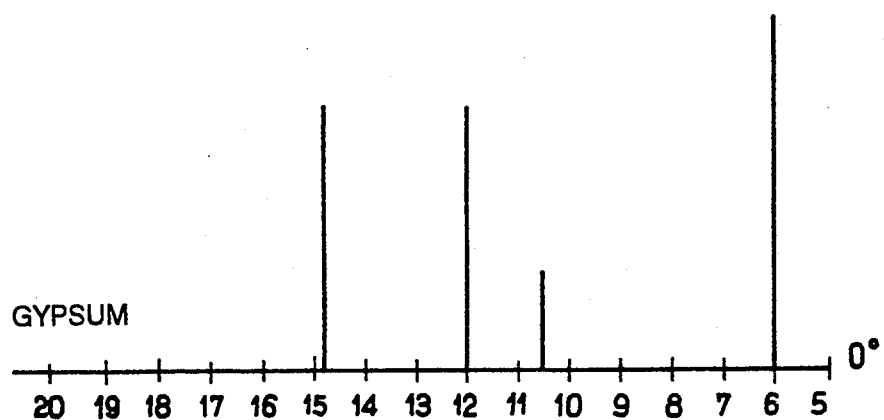
FIG. 2 is an X-ray diffraction diagram depicting the characteristic lines of gypsum.
Figure 3:
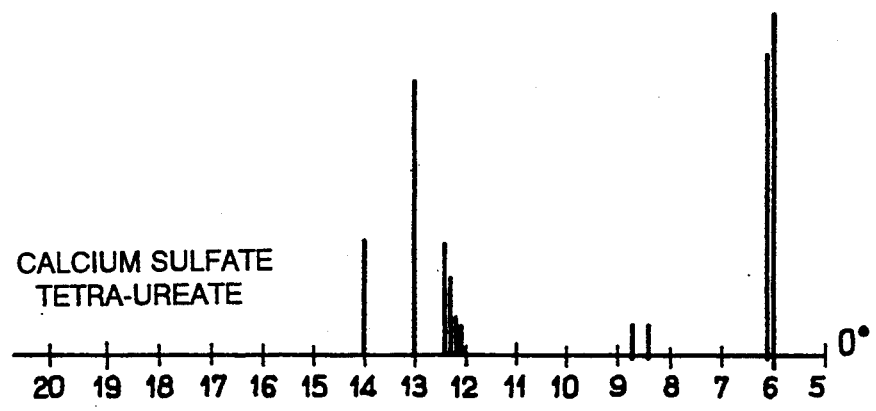
FIG. 3 is an X-ray diffraction diagram depicting the characteristic lines of calcium sulphate tetra-ureate.

The lines for these three compounds are sufficiently characteristic to permit them to be identified without risk of error.

In the products produced according to the invention, there remains no free urea in a quantity detectable by the DEBYE-SCHERRER method. On the contrary, the characteristic lines of the tetra-ureates of calcium sulfate are always clearly identifiable. The lines corresponding to gypsum or urea appear only when the proportions of urea and calcium sulfate in the final product are quite different from the stoichiometric composition $Ca\ SO_4, 4\ CO(NH_2)_2$.

In the products obtained by mixing superphosphates with urea, there can also often be detected the presence of calcium sulfate tetra-ureate, but in small proportions and always coexisting with more or less hydrated calcium sulfate and free urea. The corresponding products, in contrast to those produced according to the invention, are very difficult to dry and have a strongly hygroscopic character.

Use of the Compounds Obtained in Complex Fertilizer Compositions

The products obtained according to the invention, in which substantially all the $P_2O_5$ is soluble in neutral ammonium citrate and in which the ureates present hydrolyze in aqueous phase liberating urea, can be used, in this condition, as sulfurated NP fertilizers. They can be granulated or compacted by all the known processes.

It is particularly advantageous to effect the granulation operation several minutes after mixing in a vigorously agitated reactor, the phosphate and the sulfo-(phospho)-ureic reagent, so as to take advantage of the still-liquid condition of the reaction medium to promote at first the agglomeration of the solid recycled particles, and to profit thereafter from the "setting up" reaction to assure the cohesion and hardening of the granules thus formed.

But it is also possible to granulate or to compact the products, according to the invention, after a more or less long period of maturation. So as to avoid their solidification in the course of storage, it is in this case desirable to break down the reaction mass in the course of its "setting up" phase, before it has obtained too great a mechanical resistance.

The products obtained according to the invention can also be used, in mixture with a certain number of other primary nitrogen, phosphate or potassium materials, in the formulation of granulated complex fertilizers. Their compatibility with the following products has in particular been established: ammonium sulfate, MAP, DAP, potassium chloride, potassium sulfate.

Secondary fertilizer elements (magnesium in the form of kieserite, for example), oligo-elements (copper, zinc, boron, etc.) as well as nitrification inhibitors (dicyandiamide, for example) can also be incorporated in these complex fertilizer formulations.

Use of the Compounds Obtained in the Composition of Feed Supplements for Animals Ensilaged vegetables used to nourish animals supply only a portion of the needed nutritional elements. The feed ration of the animals must therefore often be supplemented, principally as to mineral salts (particularly mono- or bicalcium phosphates) and in proteins. In the case of ruminants which have the ability to transform urea into proteins, all or a portion of the protein component can be replaced by controlled quantities of urea.

The products according to the invention—compounds of mono- and bicalcium phosphates, and of tetra-urea calcium sulfate which has the property of hydrolyzing in aqueous phase progressively liberating urea—can be used to compound feed supplements for animals. It is evidently necessary, in this case, to start with primary phosphated materials (bone powder, calcium phosphates with controlled fluorine and heavy metal contents) free from impurities prejudicial to the health of these latter.

EXAMPLE 1

1 kg of natural Morocco phosphate containing 32% $P_2O_5$ and 52% CaO is contacted with a sulfo-urea mixture containing 3.6 moles of urea per mole of sulfuric acid, in an agitated reactor provided with a device for temperature control. The quantity of reagent necessary is calculated as follows:

52% of CaO in 1 kg of phosphate corresponds to 9.285 moles,

32% of $P_2O_5$ in 1 kg of phosphate corresponds to 2.253 moles.

The sulfuric acid necessary to fix the free calcium by transformation of the tricalcium phosphate to monocalcium phosphate is theoretically equivalent to $9.285 - 2.253 = 7.032$ moles, which corresponds to 0.689 kg of sulfuric acid.

The quantity of urea necessary to make up a reagent containing 3.6 moles of urea per mole of sulfuric acid is therefore equal to: $7.032 \times 3.6 \times 0.060 = 1.519$ kg.

The natural phosphate is first milled, so as to have a mean granulometry less than $100\mu$. 1 kg of this phosphate is introduced within the reactor into which is progressively added the 2.208 kg of reagent preliminarily prepared and stored at 50° C. The temperature of the reaction medium is maintained in a range comprised between 60° and 70° C., by modulating the flow rate of introduction of the reagent.

At the end of 5 to 6 minutes, the viscosity of the liquid reaction mixture begins to increase. Agitation is then stopped. The temperature stabilizes between 70° C. and 90° C. At the end of 2 hours, all the reaction mass has solidified. Analysis of the product reveals the following composition, the dosages being effectuated by standard methods used in the fertilizer profession:

| $P_2O_5$ total | 10.00% |
| $P_2O_5$ soluble in water | 9.05% |
| $P_2O_5$ soluble in citrate | 9.80% |
| N total | 21.75% |
| N urea | 20.55% |

Spectral analysis performed on the product, after one day of storage, discloses no line characteristic of urea while the lines corresponding to tetra-urea calcium sulfate are clearly identifiable. Urea being however lacking relative to the calcium sulfate because all of this latter will be bound in the form of tetra-ureate, the lines of weak intensity corresponding to calcium sulfate are likewise detectable.

The final product can be granulated or compacted by any known methods.

EXAMPLE 2

One proceeds similarly to Example 1, but there is added to the reagent 5% of water, that is, about 0.110 kg, which corresponds to using in all 2.318 kg of reagent per 1 kg of phosphate.

The reactive mixture then evolves more rapidly than in the preceding example. The maximum temperature rise, coincident with the beginning of the increase of the viscosity of the mixture, takes place at the end of three minutes. Analysis of the solid product obtained at the end of one hour gives the following results:

| $P_2O_5$ total | 9.67% |
| $P_2O_5$ soluble in water | 9.00% |
| $P_2O_5$ soluble in citrate | 9.57% |
| N total | 21.03% |
| N urea | 20.85% |

The degree of solubilization of the $P_2O_5$ in the neutral ammonium citrate is therefore of the order of 99%.

Spectral analysis of the product by x-ray diffusion does not reveal the presence of free urea. It shows clearly, by contrast, the presence of tetra-ureate calcium sulfate.

EXAMPLE 3

One proceeds as in Example 1, but this time the reagent contains 1.5 moles of urea per 1 mole of sulfuric acid. For 1 kg of phosphate, it therefore comprises 0.689 kg of sulfuric acid and 0.633 kg of urea.

The reaction takes place with the same rapidity as in Example 2. At the end of 3 minutes, the setting up phenomenon begins. At the end of one hour, this latter leads to a solid compact product corresponding to the following analysis:

| $P_2O_5$ total | 13.70% |
| $P_2O_5$ soluble in water | 12.82% |
| $P_2O_5$ soluble in citrate | 13.24% |
| N total | 12.52% |
| N urea | 12.08% |

The degree of solubilization of the phosphate comes out to 96%. Spectral analysis of the product leads to the same conclusions as those set forth in the preceding examples.

EXAMPLE 4

One proceeds as in Example 1 but there is added to the sulfo-ureic reagent before it enters into reaction with the phosphate, industrial phosphoric acid titrating about 54% $P_2O_5$. The liquid reagent is thus constituted of the following mixture:

| solid urea | 1.054 kg |
| 95% sulfuric acid | 0.505 kg |
| phosphoric acid with 54% $P_2O_5$ | 0.541 kg |
| total: | 2.100 kg |

This mixture contains, because of the composition of the acids used, 0.145 kg of water, which is to say about 6.9% relative to the sum of the masses of the components. By reacting this reagent with 1 kg of phosphate identical to that used in the three preceding examples, there is obtained, at the end of 6 minutes, a compact paste. Analysis of the product after solidification gives the following results:

| $P_2O_5$ total | 19.78% |
| $P_2O_5$ soluble in water | 18.42% |
| $P_2O_5$ soluble in citrate | 18.79% |
| N total | 15.54% |
| N urea | 15.37% |
| thus a total amount of assimilable $P_2O_5$ of | 95% |

The spectral analysis of the product leads to the same conclusions as those set forth in the preceding examples.

EXAMPLE 5

One starts with the product whose preparation is described in Example 2. About 20 minutes after mixing the phosphate and the sulfo-ureic reagent, the solid mass obtained is broken down with the aid of a roller into particles of dimensions less than 3 mm. At the end of one week of storage in free air at ambient temperature, there is introduced 3 kg of the product thus obtained, first preheated to 80° C., into a granulator of the "Eirich" type. There is added to the mixture about 0.1 kg of water and the temperature within the granulator is maintained during all the duration of the operation at 80° C. by sweeping this latter with a current of hot air. At the end of 10 to 15 minutes, the granules obtained are screened. The granulometric fraction comprised between 3 and 5 mm is separated, then cooled to ambient temperature.

There is thus obtained a granulated NP fertilizer, of the formula 20.10.0, possessing, without the need to be dried, excellent storage characteristics. The analysis of the product by x-ray diffraction does not detect the presence of free urea. By contrast, it clearly demonstrates the presence of tetra-urea calcium sulfate.

EXAMPLE 6

One prepares a granulated NP fertilizer, from urea, of the formula 20.10.0, but following this time the conventional method. There is thus mixed, in a granulator of the "Eirich" type, 1.5 kg of SSP (super simple phosphate titrating 20% $P_2O_5$ soluble citrate, obtained by attack of Moroccan phosphate with sulfuric acid) with 1.4 kg of a 95% aqueous urea solution, at 120° C. A slight amount of ammonia is given off. At the end of about 10 minutes, the granules formed are screened and the granulometric fraction comprised between 3 and 5 mm is cooled to ambient temperature. The granules obtained have a hygroscopic property. Their analysis, effectuated several hours later, gives the following results:

| | |
|---|---|
| $P_2O_5$ total | 10.95% |
| $P_2O_5$ soluble in citrate | 10.26% |
| $P_2O_5$ soluble in water | 8.20% |
| N total | 20.42% |
| N urea | 19.76% |
| N ammonia | 0.66% |

Spectral analysis of the product by x-ray diffraction demonstrates the presence of free urea in a large proportion while only traces of tetra-urea calcium sulfate can be detected.

EXAMPLE 7

In a cylindrical reactor, provided with a variable speed agitator, there is introduced successively:

0.664 kg of sulfo-urea reagent at 50° C., obtained by mixing 0.432 kg of solid urea, 0.196 kg of 96% sulfuric acid and 0.036 kg of water;

0.455 kg of crushed Moroccan phosphate (94% passing an 80 micron screen)

0.219 kg of potassium sulfate.

The mixture is agitated for about 2 minutes at maximum speed (about 1500 rpm), then as soon as the mixture commences to thicken the speed of the agitator is reduced to about 200 rpm. Granules then form progressively and at the end of about 10 minutes these latter have a sufficient mechanical resistance to be screened between 3 and 5 mm. There is thus obtained a ternary NPK fertilizer of the formula 15.10.08, having excellent storage properties.

EXAMPLE 8

One starts, as in Example 5, with the product whose preparation is described in Example 2. About 20 minutes after mixing the phosphate and the sulfo-urea reagent, the solid mass obtained is deaggregated with a roller into particles of dimensions less than 3 mm. At the end of one week of storage in free air at ambient temperature, there is introduced 2 kg of the product thus obtained, first preheated to 80° C., into a granulator of the "Eirich" type. There is then successfully added to the granulator 0.750 kg of DAP (18.46.00), 0.735 kg of potassium chloride and 0.250 kg of water, also preheated to 80° C., as well as a small quantity of ammonia so as to maintain the pH above 5. At the end of about 15 minutes, the granules formed are screened between 3 and 5 mm, then cooled. There is thus obtained an NPK fertilizer of the formula 15.15.13 having excellent storage properties.

We claim:

1. Process for the production of phospho-nitrogenous products whose $P_2O_5$ is substantially entirely soluble in neutral ammonium citrate and in which no free urea remains in a significant quantity, this latter being for the most part combined with calcium sulfate ureate, which comprises reacting calcium phosphate with a liquid mixture reagent comprising between 3 and 4 moles of urea per mole of sulfuric acid so as to obtain a reaction product containing mono and/or bicalcium phosphates and urea substantially bound as the tetra-ureate of calcium sulfate.

2. Process according to claim 1, further comprising adding phosphoric acid to the reagent in a molar proportion so as to obtain a composition containing between 0.1 and 2 moles $P_2O_5$ per mole of sulfuric acid.

3. Process according to claim 1, further comprising maintaining the temperature of the reaction at a value below 90° C.

4. Process according to claim 3, wherein the temperature is maintained at a value between 40° and 70° C.

5. Process according to claim 1, further comprising granulating the reaction product, said granulation taking place several minutes after reacting the calcium phosphate and the reagent.

6. Process according to claim 1, further comprising granulating or compacting the reaction product after completion of the reaction between the calcium phosphate and the reagent.

7. Process according to claim 1, further comprising adding to one of the reaction mixture and the reaction product, at least one constituent selected from:

nitrogenous materials including ammonium sulfate or DAP;

phosphated materials including natural crushed phosphate, TSP, MAP or DAP;

potassium materials including potassium chloride or sulfate;

secondary fertilizer elements including kieserite or gypsum;

oligo-elements;

and mixtures of several of these constituents.

8. Process according to claim 1, wherein the calcium phosphate is a phosphate of natural original, and the reaction product obtained is suitable for the fertilization of soil.

9. Process according to claim 1, wherein the calcium phosphate used is free from compounds incompatible with animal feed, and the reaction product obtained is adapted to be used in supplemental feed compositions for animals.

* * * * *